May 2, 1961 T. ZUBRYCHI 2,981,971
SAUSAGE SLITTERS

Filed July 6, 1959 3 Sheets-Sheet 1

Inventor:
Theodore Zubrychi,
by Robert K. Randall,
Attorney

May 2, 1961 — T. ZUBRYCHI — 2,981,971
SAUSAGE SLITTERS

Filed July 6, 1959 — 3 Sheets-Sheet 2

Inventor:
Theodore Zubrychi,
by Robert K. Randall,
Attorney

May 2, 1961 T. ZUBRYCHI 2,981,971
SAUSAGE SLITTERS
Filed July 6, 1959 3 Sheets-Sheet 3

Inventor:
Theodore Zubrychi
by Robert K. Randall,
Attorney

United States Patent Office 2,981,971
Patented May 2, 1961

2,981,971
SAUSAGE SLITTERS
Theodore Zubrychi, 30 Sanger St., Bridgewater, Mass.
Filed July 6, 1959, Ser. No. 825,131
1 Claim. (Cl. 17—25)

This invention relates to a method and apparatus for slitting the casings of frankfurter sausages, and aims to provide a fast, easy, safe, and sanitary way and means for so doing.

The conventional frankfurter casing of edible membrane formed from animal intestinal tract, and in certain instances the cellulose type of casing, are prone to burst and split in the cooking, whether by boiling or grilling, with resultant bulging of the contents and warping, distortion, or breakage of the sausage which detract from its appeal to the eye and make it hard to serve in the familiar manner in a split roll of bread. So it is common practice to perforate the casing with a fork or slice through it lengthwise with a knife, to relieve the bursting forces generated within it during the cooking. In restaurants and "hot dog" stands where rapid customer service is required, these manipulations involve risk of injury to the fingers of the help, hence the operation usually comes down to a few hasty hacks across the frankfurter with a knife, of random and varying depth, with the result that the cooked sausage breaks or is bent angularly at one or more cuts, spoiling the appearance, and making it hard to insert it into the split roll in a manner facilitating the eating of the serving in the usual way out of hand.

I have found that a frankfurter in which the casing or skin is slitted spirally by shallow cuts at a low angle to its axis at a plurality of locations spaced about its circumference not only does not burst, bulge, or break, but further stays straight or assumes a straight relation if initially curved, and, most important, cooks faster, while the skin curls back at each side of the respective slits and the meat blossoms forth therefrom, to make the sausage look bigger and acquire enhanced flavor through contact with the heated grill and release the aroma of the stuffing, all of which add to the attractive appearance and savor of the article. This type of slitting permits easy peeling of the casing from the meat if desired, which gets rid of the inedible cellulose or other type of synthetic casings, without breaking the body of stuffing. Even when not peeled, the sausage is more easily bitten off and masticated, when the natural type of casing is thus parted into three or four strips. Since the strips are continuous throughout the length of the sausage, they still serve to hold the stuffing against breakage.

To slit frankfurters in this manner, I have provided a device which feeds a single link or any number of connected links of sausage endwise and automatically past a set of stationary slitting knives disposed at preferably equally spaced locations about the axis of the sausage, while rotating the sausage about its axis so that each knife makes a shallow cut just through the casing in a flat spiral of low angle to the axis.

Frankfurters cased in natural animal membrane are tacky and resist sliding over stationary surfaces which may be used to guide them through a mechanical slitting device. In my slitter this clinging characteristic is utilized by making the main guiding surfaces the ones that propel the sausage past the knives, using knurled obliquely disposed driven rolls for this purpose, so that these engaged surfaces travel with the sausage, and the only contact with the remaining stationary guiding surfaces is reduced to point or line contact with the sides of the large diameter exit passage whereby the sausage is delivered from the feed rolls, while the axial rotation of the sausage prevents sticking here.

For safety, the slitting knives are not only stationary at all times, but are shielded by the rolls so as to be almost inaccessible to the hands of anyone working with or cleaning the machine.

For sanitary considerations, the knurled feed rolls which are the main parts engaging the sausage are exposed for practically their full length when the machine's cover is slipped off, and thus they are completely accessible for cleaning, and any juices or meat fragments released through the slits in the sausage casing are easily visible and can be wiped or washed off with ease from the rolls, and cannot accumulate thereon. The exit passage is large and has a smooth cylindrical interior surface, with no corners or crannies, and is easily cleaned.

Other objects of the invention, and the manner of their attainment, are as set forth hereinafter.

An illustrative embodiment of the invention is shown in the accompanying drawings, in which—

Figure 1:
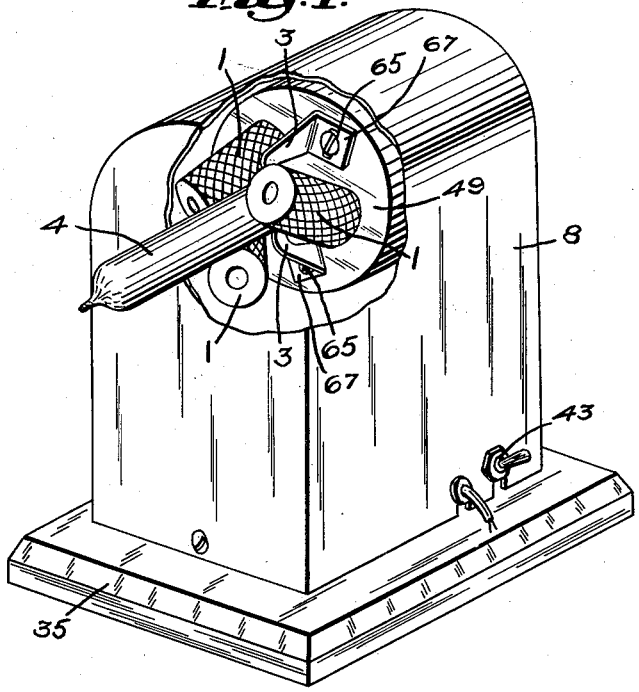
Fig. 1 is a perspective view of the machine with the cover on, the cover being broken away to show the feed rolls and knives in action on a frankfurter.
Figure 2:
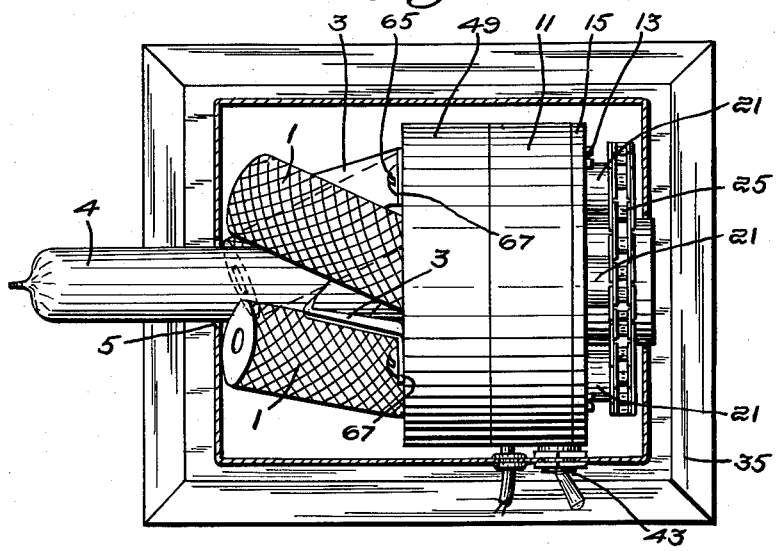
Fig. 2 is a plan view with the cover sectioned.

The improved slitter employs three rolls 1 preferably having their cylindrical surfaces knurled as shown, to grip the sausage 4 and feed it lengthwise past three hook-shaped knives 3 which slit the casing or skin of the sausage along the spiral lines 6 as it travels lengthwise through the rolls. The three feed rolls are each disposed at an angle to the axis of the sausage and in a plane parallel thereto. The cover 8 has a circular aperture 5, Fig. 4, into which the sausage is introduced and pushed by hand until it enters the space between the three rolls, which are mounted in equally spaced relation about the axis of this aperture 5.

The rolls 1 as noted are respectively mounted for rotation about axes which are oblique both to the axis of aperture 5 and to a plane radial to such axis, close enough together so that a sausage entered between them will be simultaneously engaged by the rolls at points 120° apart on its circumference and gripped firmly by the rolls, but without any harmful degree of compression. Otherwise expressed, each roll at the point where it engages the sausage is less than the length of the chord of a 120° sector of a frankfurter from its adjacent rolls.

Figure 3:
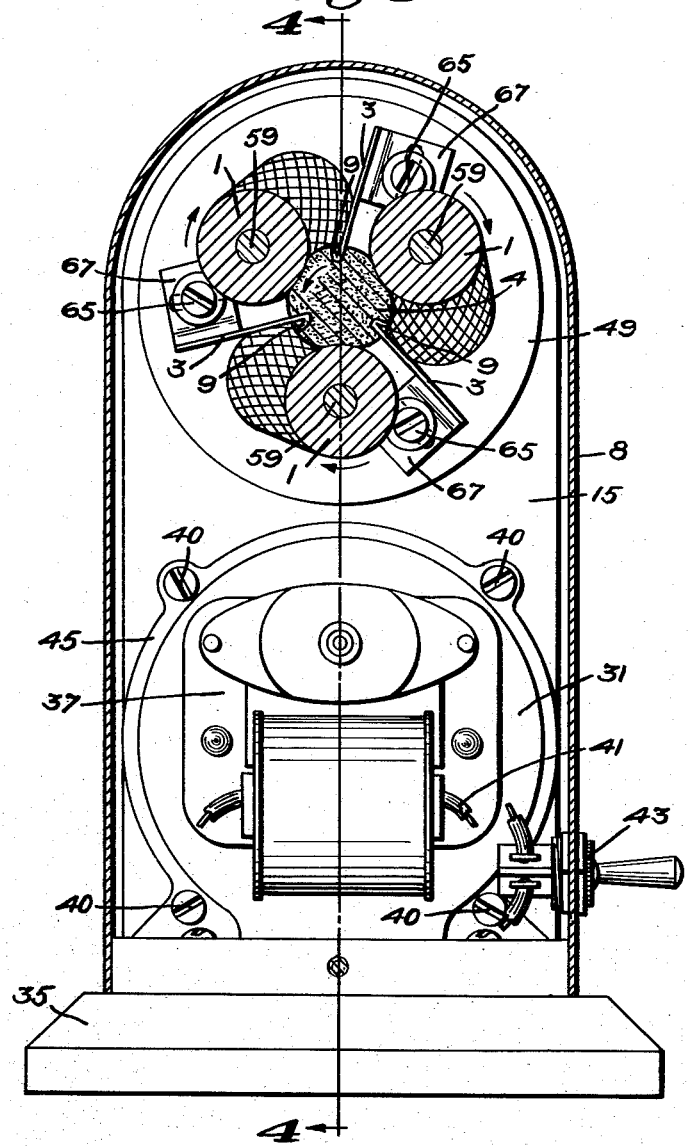
Fig. 3 is a section on line 3—3 of Fig. 4 showing the knives and feed rolls operating upon a frankfurter, together with the motor and reduction gear which drive the feed rolls.

The rolls are driven in unison all in the same direction of rotation and at the same speed, herein clockwise as shown in Fig. 3, whereby the sausage is simultaneously rotated counterclockwise about its axis and fed lengthwise along such axis, and out through the axial passage 7 defined by the structure supporting the feed rolls 1. This is because all points on the surface of each roll 1 which are in engagement with the sausage are moving obliquely away from the aperture 5 throughout the period when they are in contact with the surface of the sausage, owing to the obliquity of the roll axes.

The hooked end of each knife 3 is sharpened on its convex edge, at 9, and projects into the passage between the three feed rolls to an extent sufficient merely to intercept and cut through the skin of the sausage with but minor penetration into the contents thereof, about ⅛ inch. This manner of feeding is adequate to insure slitting the skin at any depressed areas which may be present in the sausage. Since the sausage is being both advanced lengthwise and rotated about its axis, each slit 6 extends spirally around the sausage from one and to the other, herein at equally spaced intervals of 120° apart. The feeding of the sausage continues until its rear end passes beyond the grip of the rolls, whereupon its leading end protruding from passage 7 may be grasped by the user's hand and removed for cooking.

The passage 7 serves merely as a guide to steer the sausage out from the casing at 69. It is defined in part by an axial opening in a cylindrical member 11 mounted by screws 13 on an upright plate 15 having an aperture admitting a tubular integral extension 9 of member 11 therethrough. This member is drilled at three points equidistant about the axis of extension 9 to form bushed bearings 16 for the rigid end members 17 of flexible shafts 19 on each of which one of the feed rolls 1 is mounted, and whereby the latter are driven. On the outer end of end portion 17 of each flexible shaft 19 there is fixed by setscrews 20 the hub 21 of a small spur gear 23. This gear is engaged and driven by a chain 25 driven by a sprocket 27 on the output shaft 29 of reduction gearing of conventional form enclosed in a housing 31 mounted by means of its foot 33 upon a suitable base 35 and driven by an electric motor 37 mounted on one side of housing 31 and driving the input shaft (not shown) of the reduction gearing, the motor being supplied with electric current via leads 41 under control of switch 43. The plate 15 is cut away at 22 for the hubs 21, and is affixed to the other side of housing 31 by four screws 40 passing through the flange 45 of housing 31 and through vertical slots in the plate into straps 47 with which they are in screw-threaded engagement. This provides for raising or lowering the plate 15 and the parts mounted thereon, to adjust the chain tension.

Figure 4:
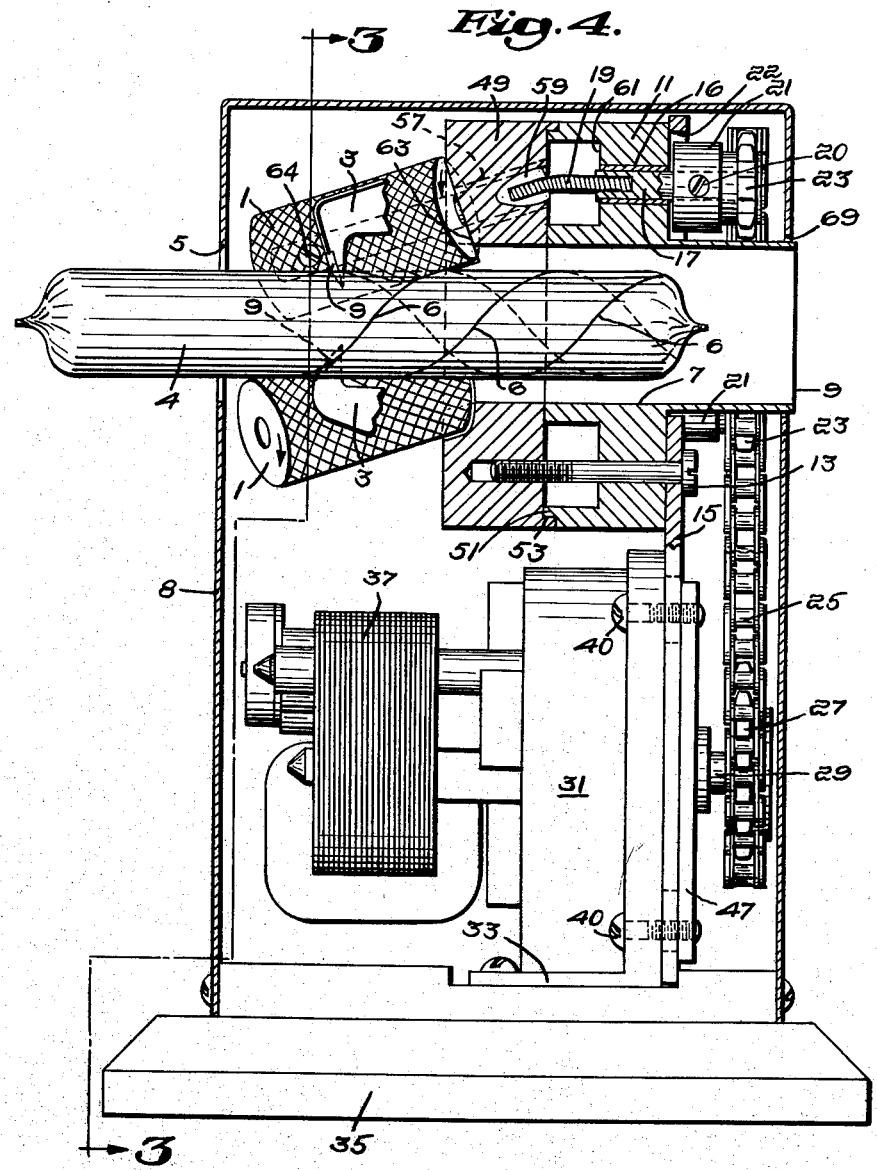
Fig. 4 is an elevation mainly in vertical section on line 4—4 of Fig. 3.

A cylindrical member 49 of outside diameter identical with member 11 is recessed as indicated at 53, Fig. 4, to fit over the lip 51 of reduced diameter at the inward end of member 11, and is provided with a central aperture registering with the bore of member 11 to form therewith the smooth and unbroken guide passage 7. Member 49 is bored at 120° intervals about the axis of such aperture to provide passages 57 facing the bearings 16 and disposed obliquely to such axis and to a plane radial to such axis, to form bushed bearings for the long rigid end portions 59 of the flexible shafts 19. The rolls 1 are mounted on these end portions 59 and secured by setscrews 64.

The intermediate portion of each flexible shaft 19 is composed of helically coiled or stranded flexible shafting having its ends fixed as by soldering or otherwise in recesses formed in the proximate ends of end portions 17 and 59. To provide scope for the bending of this intermediate portion of each drive shaft 19 the member 11 is formed with a relatively deep recess 61 in its inner face, and thus free rotation of each drive shaft is permitted in spite of the fact that its two rigid end portions are far out of line with each other.

The outward end of each bearing or passage 57 is counterbored at 63 to receive the inner end of each feed roll 1. The two members 11 and 49 are clamped together by screws 13.

Each knife 3 is affixed to the outer face of member 49 by a screw 65 through its angularly disposed foot 67, which is slotted to permit adjustment of the knife toward and from the axis of passage 7 and thus vary the depth of cut, or fit the spaced relation of the knife blades to the diameter of the sausage.

Stainless steel cover 8 is provided to enclose the entire machine down to its base, aperture 69 fitting the outside diameter of the extension 9 of passage 7. This cover is easily slid up and off from the working parts to give access thereto for cleaning and servicing.

It is to be noted that the knives 3 engage the sausage at the zone and between the areas of engagement of the feed rolls therewith. Due to the compression of the sausage at three points in its circumference in this zone, it bulges outward slightly beyond its initial contour between these compression areas, and thus its skin encounters all the knives with certainty throughout the length of the sausage, regardless of any hollows or flat places or other distortions originally present therein.

It is further to be noted that the sausage is engaged, propelled, and supported solely by surfaces which move with it, without any relative sliding action, until the cutting is finished and it drops into the guide passage 7, from which it is removed by hand.

While I have illustrated and described a certain form in which the invention may be embodied, I am aware that many modifications may be made therein by any person skilled in the art, without departing from the scope of the invention as expressed in the claim. Therefore, I do not wish to be limited to the particular form shown, or to the details of construction thereof, but what I do claim is:

A sausage slitter having in combination a support having a passage therethrough, at least three feed rolls disposed in relatively spaced relation about the axis of such passage, flexible shafts on which the feed rolls are mounted, bearings for each shaft one thereof parallel to the passage and one oblique thereto and carrying an end of such shaft on which a feed roll is fixed, a spur gear fixed on the end of such shaft occupying the bearing parallel to the passage, a chain engaging the spur gears, and driving means for the chain.

References Cited in the file of this patent
UNITED STATES PATENTS

| | | |
|---|---|---|
| 2,514,660 | McClure et al. | July 11, 1950 |
| 2,552,046 | Justice | May 8, 1951 |
| 2,672,646 | Demarest et al. | Mar. 23, 1954 |
| 2,675,580 | Pesce | Apr. 20, 1954 |
| 2,702,404 | Rufenach | Feb. 22, 1955 |
| 2,722,256 | Hise | Nov. 1, 1955 |